United States Patent
Yasuda et al.

(10) Patent No.: US 9,802,263 B2
(45) Date of Patent: Oct. 31, 2017

(54) ELECTRICAL DISCHARGE MACHINE AND METHOD FOR MANUFACTURING MACHINED OBJECT USING THE SAME

(71) Applicant: DENSO CORPORATION, Kariya, Aichi-pref. (JP)

(72) Inventors: Kouichirou Yasuda, Aisai (JP); Yasuji Inobe, Nagoya (JP); Akira Itoh, Kariya (JP); Nobuhiko Nagai, Kounan (JP); Tetsuji Yamaguchi, Obu (JP); Hiroyuki Ootani, Anjo (JP)

(73) Assignee: DENSO CORPORATION, Kariya (JP)

( * ) Notice: Subject to any disclaimer, the term of this patent is extended or adjusted under 35 U.S.C. 154(b) by 207 days.

(21) Appl. No.: 14/635,400

(22) Filed: Mar. 2, 2015

(65) Prior Publication Data
US 2015/0246402 A1    Sep. 3, 2015

(30) Foreign Application Priority Data
Feb. 28, 2014    (JP) .................................. 2014-038288

(51) Int. Cl.
B23H 1/04    (2006.01)
B23H 7/30    (2006.01)
(Continued)

(52) U.S. Cl.
CPC ................. *B23H 1/04* (2013.01); *B23H 7/30* (2013.01); *B23H 9/14* (2013.01); *B23H 1/00* (2013.01); *B23H 7/38* (2013.01); *B23H 11/00* (2013.01)

(58) Field of Classification Search
CPC ... B23H 1/04; B23H 7/30; B23H 9/14; B23H 1/00; B23H 7/38; B23H 11/00
(Continued)

(56) References Cited

U.S. PATENT DOCUMENTS 3,912,898 A * 10/1975 Pfau .................... G05B 19/07
                                                        219/69.14
5,453,653 A    9/1995 Zumeris
(Continued)

FOREIGN PATENT DOCUMENTS

JP    H07-184382 A    7/1995
JP    2011-104660 A    6/2011
(Continued)

*Primary Examiner* — Brian Jennison
(74) *Attorney, Agent, or Firm* — Oliff PLC

(57) ABSTRACT

In an electrical discharge machine that applies a voltage between an electrode and a workpiece to generate electrical discharge, an electrode holder holds the electrode. An ultrasonic motor has a fingertip that comes into contact with electrode holder, and moves electrode holder in a driving direction by moving the fingertip in an annular manner at an ultrasonic-range frequency. A roller bearing guides the movement of the electrode holder in the driving direction. A control circuit controls a position of the electrode in the driving direction by driving the ultrasonic motor, and moves the electrode holder based on an abnormality occurring in resistance against the movement of the electrode holder in the driving direction such that the electrode holder is moved by a movement distance equivalent to when the largest roller element among a plurality of roller elements of the roller bearing rolls and rotates once without sliding or longer.

11 Claims, 11 Drawing Sheets

(51) Int. Cl.
*B23H 9/14* (2006.01)
*B23H 1/00* (2006.01)
*B23H 7/38* (2006.01)
*B23H 11/00* (2006.01)

(58) Field of Classification Search
USPC .................................................. 219/69.15
See application file for complete search history.

(56) References Cited

U.S. PATENT DOCUMENTS

| | | | |
|---|---|---|---|
| 5,616,980 A | 4/1997 | Zumeris | |
| 6,538,227 B1 * | 3/2003 | Sano | ........................ B23H 1/00 |
| | | | 219/69.2 |
| 2011/0186551 A1 * | 8/2011 | Itoh | ........................ B23H 1/02 |
| | | | 219/69.13 |

FOREIGN PATENT DOCUMENTS

| | | |
|---|---|---|
| JP | 2011-104689 A | 6/2011 |
| JP | 2011-104735 A | 6/2011 |
| JP | 2011-115910 A | 6/2011 |

* cited by examiner

ELECTRICAL DISCHARGE MACHINE AND METHOD FOR MANUFACTURING MACHINED OBJECT USING THE SAME

CROSS-REFERENCE TO RELATED APPLICATION

This application is based on and claims the benefit of priority from Japanese Patent Application No. 2014-038288, filed Feb. 28, 2014, the disclosure of which is incorporated herein in its entirety by reference.

BACKGROUND

Technical Field

The present invention relates to an electrical discharge machine and a method for manufacturing a machined object using the electrical discharge machine.

Related Art

An ultrasonic motor is conventionally known (refer to, for example, JP-A-2011-104735). The ultrasonic motor is used in an electrical discharge machine to move an electrode holder that holds an electrode. The ultrasonic motor has a fingertip that comes into contact with the electrode holder. The ultrasonic motor drives the electrode holder by moving the fingertip in an annular manner at an ultrasonic-range frequency.

When an ultrasonic motor such as this is used, the movement of the electrode holder can be controlled to be at an extremely short unit of distance (such as 1 μm or less). However, according to experiments conducted by the inventors, problems may occur when a roller bearing is used as a member for guiding the movement of the electrode holder in a driving direction. In the roller bearing, a plurality of rolling elements are interposed between a movement block and a rail.

Specifically, when the electrode holder is moved over a long period at an extremely short unit of distance, slide resistance in the roller bearing increases. The movement speed of the electrode holder decreases. As a result, it is highly likely that the time required for machining will increase.

The reason such a phenomenon occurs is that dust is produced between the rolling elements and the surrounding path. When movement of the electrode holder by an extremely short unit of distance is repeatedly performed numerous times, the plurality of rolling elements within the roller bearing move by minute vibrations, without rotating. As a result, dust is produced by the roller elements and the surrounding path rubbing against each other.

SUMMARY

It is thus desired to provide an electrical discharge machine that drives an electrode holder using an ultrasonic motor and guides the electrode holder using a roller bearing, in which increase in the time required for machining due to increase in sliding resistance in the roller bearing is less likely.

An exemplary embodiment provides an electrical discharge machine that applies a voltage between an electrode and a workpiece, thereby generating electrical discharge. The workpiece is melted by the electrical discharge and machined. The electrical discharge machine includes: an electrode holder that holds the electrode; an ultrasonic motor that has a fingertip that comes into contact with the electrode holder, and moves the electrode holder in a driving direction by moving the fingertip in an annular manner at an ultrasonic-range frequency; a roller bearing that guides the movement of the electrode holder in the driving direction; and a control circuit that controls the position of the electrode in the driving direction by driving the ultrasonic motor. The roller bearing includes: movement blocks that are fixed to the electrode holder; a rail that supports the movement blocks and guides the movement of the movement blocks; and a plurality of roller elements that are interposed between the movement blocks and the rail. The control circuit moves the electrode holder based on an abnormality occurring in resistance against the movement of the electrode holder in the driving direction. The electrode holder is moved by a movement distance equivalent to when the largest roller element among the plurality of roller elements rolls and rotates once without sliding or longer.

When the sliding resistance between the rail and the movement blocks becomes greater than that in a normal state, the resistance against the movement of the electrode holder in the driving direction is no longer normal. Therefore, based on an abnormality occurring in the resistance against the movement of the electrode holder in the driving direction, an operation to resolve the increase in sliding resistance is performed. As a result, the increase in sliding resistance can be appropriately suppressed. In addition, as a result of the electrode holder being moved by a movement distance of when the largest roller element among the plurality of roller elements rolls and rotates once without sliding or longer, even when dust is produced, the produced dust can be dispersed. Therefore, the increase in sliding resistance can be suppressed.

DESCRIPTION OF EMBODIMENTS

First Embodiment

A first embodiment of the present disclosure will hereinafter be described. An electrical discharge machine 1 (see FIG. 1) according to the present embodiment is an apparatus that generates an electrical discharge by applying a voltage between an electrode and a workpiece (an object to be machined). The workpiece is melted by the electrical discharge and thereby machined.

Figure 1:
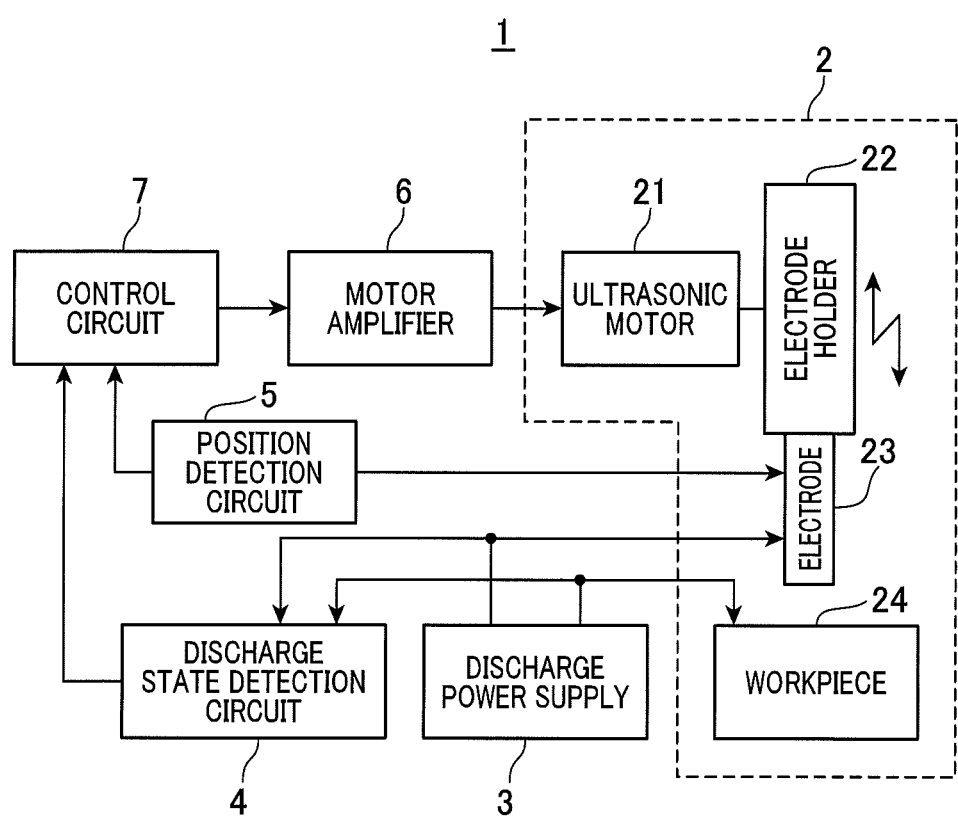
FIG. 1 is a configuration diagram of an electrical discharge machine 1 according to an embodiment of the present disclosure.

As shown in FIG. 1, the electrical discharge machine 1 includes a mechanical unit 2, a discharge power supply 3, a discharge state detection circuit 4, a position detection circuit 5, a motor amplifier 6, and a control circuit 7. The mechanical unit 2 is a section within the electrical discharge machine 1 that performs mechanical operations. The mechanical unit 2 includes an ultrasonic motor 21, an electrode holder 22, an electrode 23, and the like. A workpiece 24 is set on the mechanical unit 2.

The ultrasonic motor 21 moves the electrode holder 22 in a driving direction (specifically, an up/down direction and a feeding direction of the electrode 23). The electrode holder 22 holds the electrode 23. The electrode 23 is a wire-shaped electrode that has a narrow diameter (such as a diameter of 0.2 mm or less). For example, the electrode 23 is configured by a thin, hollow (or solid) rounded bar that is composed of copper, tungsten, or the like. When the electrode holder 22 is moved in the driving direction by the ultrasonic motor 21, the electrode 23 similarly moves in the driving direction.

The discharge power supply 3 is an apparatus that repeatedly applies a predetermined voltage in a pulsing manner between the electrode 23 and the workpiece 24. The repetition cycle is, for example, several ten thousandth of a second to several ten millionths of a second. When the electrode 23 is separated from the workpiece 24 by an appropriate distance and the voltage is applied between the electrode 23 and the workpiece 24, an electrical discharge is generated between the electrode 23 and the workpiece 24. Machining is carried out by a portion of the workpiece 24 being melted.

The discharge state detection circuit 4 detects a discharge state of the discharge power supply 3 (in other words, the discharge state between the electrode 23 and the workpiece 24) at all times. The discharge state detection circuit 4 then outputs the discharge state obtained as the detection result to the control circuit 7, as a discharge state signal. The detected discharge state may be the discharge voltage applied between the electrode 23 and the workpiece 24, the discharge current flowing between the electrode 23 and the workpiece 24, or the like.

The position detection circuit 5 is a known circuit that detects the position of the electrode holder 22 in the driving direction. The position detection circuit 5 then outputs the detected position to the control circuit 7.

The motor amplifier 6 is a circuit that drives the ultrasonic motor 21 based on an electrode driving signal received from the control circuit 7. More specifically, the motor amplifier 6 operates the ultrasonic motor 21 only during a period in which the following electrode driving signal is received from the control circuit 7. The electrode driving signal during this period has a voltage level of which the absolute value exceeds a predetermined value (specifically, zero). The motor amplifier 6 operates the ultrasonic motor 21 at a higher speed as the absolute value of the voltage level of the received electrode driving signal increases, thereby moving the electrode holder 22 at a high speed. Hereafter, reception of an electrode driving signal that has a voltage level of which the absolute value exceeds the predetermined value (specifically, zero) is simply referred to as reception of an electrode driving signal.

The control circuit 7 is a known microcomputer that includes a central processing unit (CPU), a random access memory (RAM), a read-only memory (ROM), a flash memory, and the like. The CPU runs programs stored in the ROM. As a result, the control unit 7 outputs the electrode driving signal to the motor amplifier 6 based on the discharge state signal received from the discharge state detection circuit 4. In general, the control circuit 7 controls the position of the electrode 23 in the driving direction by outputting the electrode driving signal to the motor amplifier 6 so that the distance between the electrode 23 and the workpiece 24 is an appropriate distance.

Figure 2:
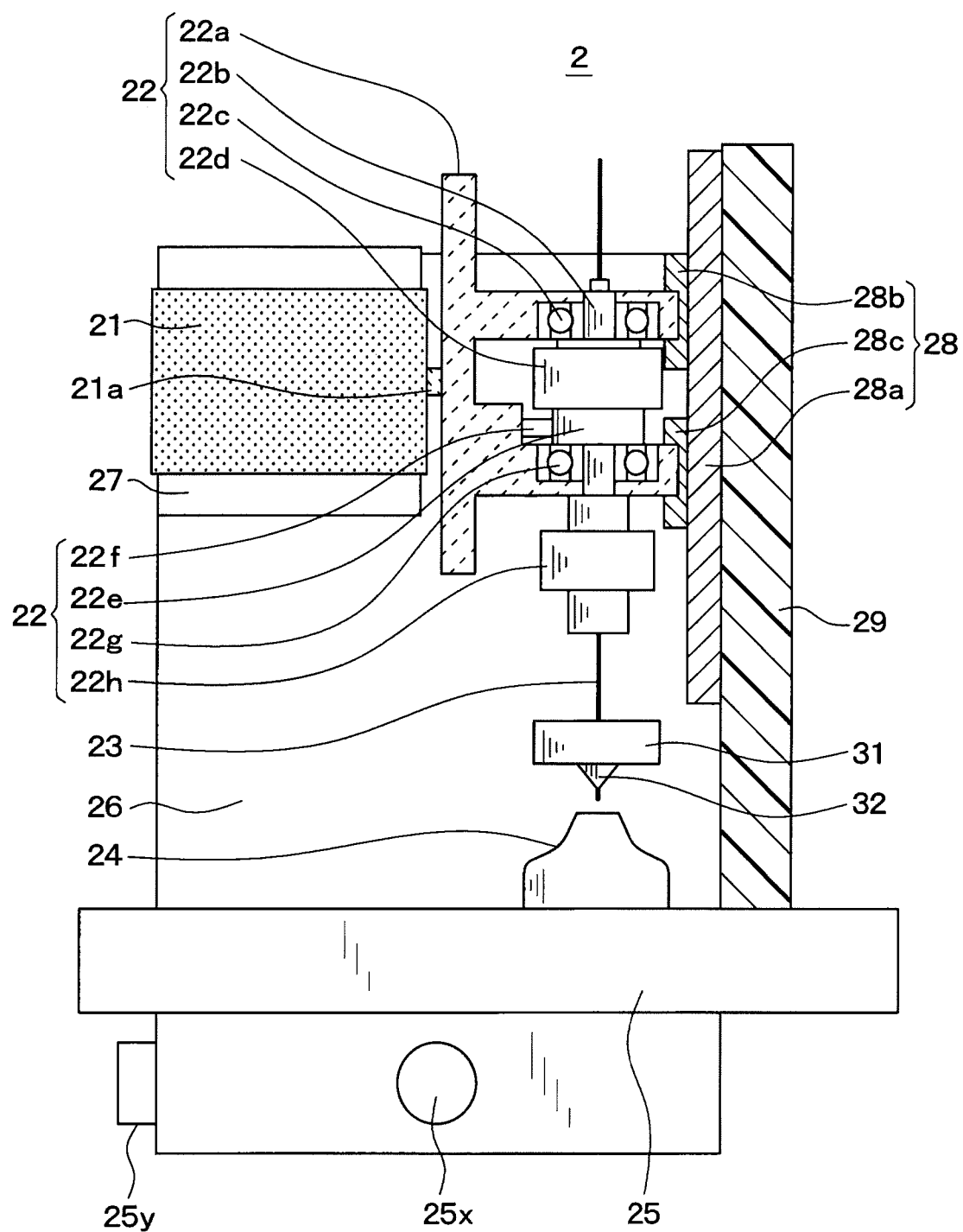
FIG. 2 is a cross-sectional view of a mechanical unit.

FIG. 2 shows a detailed configuration of the mechanical unit 2. The mechanical unit 2 includes the above-described ultrasonic motor 21, electrode holder 22, and electrode 23. In addition, the mechanical unit 2 includes an XY stage 25, a back plate 26, a fixed plate 27, a linear guide 28, a side plate 29, an electrode guide holder 31, and an electrode guide 32.

The XY stage 25 is a stage on which the workpiece 24 is placed. The XY stage 25 is capable of changing the position of the workpiece 24 within a horizontal plane, in relation to the electrode 23, by moving the workpiece 24 in an X movement axis 25$x$ direction and a Y movement axis 25$y$ direction. In addition, the XY stage 25 is electrically connected with a ground-side terminal of the discharge power supply 3, via a feeder line (not shown).

The back plate 26 is a standing wall that is fixed to the XY stage 25. The fixed plate 27 is a plate that is screwed and fixed to the back plate 26 so as to be parallel with the back plate 26. The ultrasonic motor 21 and the electrode holder 22 are fixed to a surface of the fixed plate 27 that is opposite to the surface on the back plate 26 side.

Here, the ultrasonic motor 21 will be described. The ultrasonic motor 21 drives the electrode 23. The ultrasonic motor 21 is a motor that moves a fingertip 21$a$ in an annular manner (specifically, elliptically) at an ultrasonic-range frequency. The operation speed of the ultrasonic motor 21 corresponds to the rotation frequency of the elliptical movement of the fingertip 21$a$ per unit time. The elliptical movement of the fingertip 21$a$ is an elliptical movement in a clockwise or counterclockwise direction on the paper surface of FIG. 2. A micro-motor described in JP-A-H07-184382 may be used as the ultrasonic motor 21 such as this. The micro-motor is widely available under the name HR1 motors from Nanomotion, Ltd.

More specifically, in the ultrasonic motor 21, electrodes are formed in four locations in a checkered grid shape on a rectangular piezo-ceramic element. In addition, the ultrasonic motor 21 includes the fingertip 21$a$ in a center portion of one side of the rectangle. A high-frequency voltage at substantially 50 kHz is applied to the electrodes in two locations on a diagonal line, among the electrodes in the four locations of the ultrasonic motor 21. As a result, the ceramic element is expanded, contracted, and bent. Elliptical movement at a rotation frequency of substantially 50 kHz is generated in the fingertip 21$a$.

The electrode holder 22 includes a holder main body 22$a$, a first holding member 22$b$, a first bearing 22$c$, a rotation transmitting member 22d, a rotating conductive member 22e, a conductive brush 22f, a second bearing 22g, and a second holding member 22h.

The holder main body 22a holds the other members 22b to 22h of the electrode holder 22. In addition, the holder main body 22a is in contact with the fingertip 21a at the tip portion of the ultrasonic motor 21 at all times. A ceramic plate is embedded in the portion of the holder main body 22a that comes into contact with the fingertip 21a. When the ultrasonic motor 21 is operated and the fingertip 21a is elliptically moved, the elliptical movement of the fingertip 21a is transmitted to the holder main body 22a as a result of a spring that is attached to the piezo-ceramic element. The holder main body 22a linearly moves in the driving direction. In addition, the holder main body 22a and the other members 22b to 22h of the electrode holder 22 integrally move in the driving direction.

Figure 3:
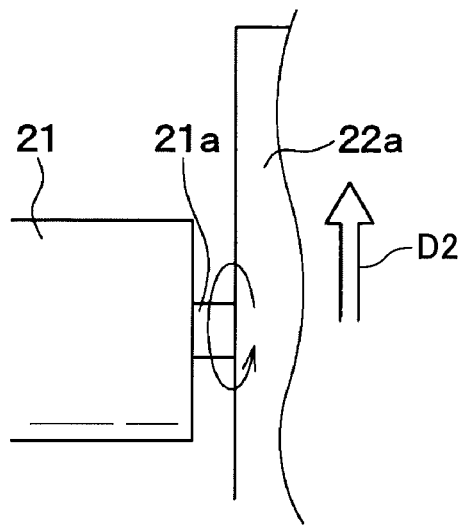
FIG. 3 is a diagram of a relationship between elliptical movement of a fingertip and ascending movement of a holder main body.
Figure 4:
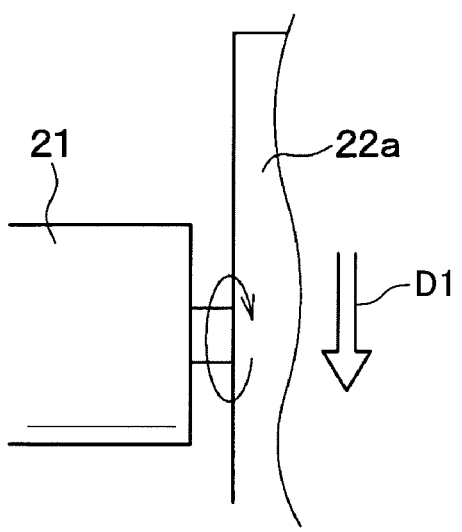
FIG. 4 is a diagram of a relationship between elliptical movement of the fingertip and descending movement of the holder main body.

Here, the relationship between the elliptical movement of the fingertip 21a and the movement of the holder main body 22a will be described, with reference to FIGS. 3 and 4. As shown in FIG. 3, when the holder main body 22a is moved upwards (in other words, in a direction away from the workpiece 24 in the driving direction; corresponding to an example of a second direction D2), the fingertip 21a is elliptically moved in a counter-clockwise direction on the paper surface. In addition, as shown in FIG. 4, when the holder main body 22a is moved downwards (in other words, in a direction approaching the workpiece 24 in the driving direction; corresponding to an example of a first direction D1), the fingertip 21a is elliptically moved in a clockwise direction on the paper surface.

The fingertip 21a and the holder main body 22a are in a state of contact at all times during the counter-clockwise elliptical movement. However, the fingertip 21a presses more firmly against the holder main body 22a when the fingertip 21a is ascending, compared to when the fingertip 21a is descending. Therefore, the frictional force of the fingertip 21a on the holder main body 22a is greater when the fingertip 21a is ascending. As a result, the holder main body 22a ascends, when viewed as a whole.

In addition, the fingertip 21a and the holder main body 22a are in a state of contact at all times during the clockwise elliptical movement as well. However, in this case, the fingertip 21a presses more firmly against the holder main body 22a when the fingertip 21a is descending, compared to when the fingertip 21a is ascending. Therefore, the frictional force of the fingertip 21a on the holder main body 22a is greater when the fingertip 21a is descending. As a result, the holder main body 22a descends, when viewed as a whole.

In addition, when the fingertip 21a stops the elliptical movement, the holder main body 22a also stops due to the frictional force between the fingertip 21a and the holder main body 22a caused by the fingertip 21a and the holder main body 22a being in contact.

The electrode 23 is inserted through the center portions of the first holding member 22b, the rotation transmitting member 22d, the rotating conductive member 22e, and the second holding member 22h. The first holding member 22b, the rotation transmitting member 22d, the rotating conducting member 22e, and the second holding member 22h hold the electrode 23 that is inserted through the center portions.

The rotation transmitting member 22d is rotated by a rotation mechanism (not shown). A contact-type rotation transmitting mechanism, such as a gear mechanism, may be used as the rotation mechanism. Alternatively, a non-contact-type rotation transmitting mechanism, such as an air spindle mechanism (refer to, for example, JP-A-2011-104735) may be used. For example, when the gear mechanism is used, the rotation transmitting member 22d is a gear that rotates around an axis (the portion through which the electrode 23 is inserted). The rotation transmitting member 22d meshes with another gear (not shown), thereby receiving transmission of rotational force from the other gear and rotating.

The rotation transmitting member 22d is configured to rotate integrally with the first holding member 22b, the rotating conductive member 22e, and the second holding member 22h.

In addition, the first holding member 22b is supported by the holder main body 22a with the first bearing 22c therebetween. The first holding member 22b is capable of rotating in relation to the holder main body 22a. In addition, the second holding member 22h is supported by the holder main body 22a with the second bearing 22f therebetween. The second holding member 22h is capable of rotating in relation to the holder main body 22a.

As a result of this configuration, when the rotation transmitting member 22d rotates in relation to the holder main body 22a, the first holding member 22b, the rotating conductive member 22e, and the second holding member 22h rotate together with the rotation transmitting member 22d. In accompaniment with the rotation, the electrode 23 also rotates in relation to the holder main body 22a.

In addition, the rotating conductive member 22e is electrically conductive with a non-ground-side terminal of the discharge power supply 3, with the conductive brush 22f therebetween. As a result, the discharge power supply 3 can apply a voltage to the electrode 23 via the conductive brush 22f.

The electrode guide holder 31 is fixed to the back plate 26 below the electrode holder 22. The electrode guide 32 is supported by the electrode guide holder 31 so as to be capable of rotating in relation to the electrode guide holder 31. In addition, the electrode guide 32 has a through hole through which the electrode 23 is inserted. The electrode 23 extends downward from the second holding member 22h. As a result of the electrode 23 passing through the through hole in the electrode guide 32, the electrode 23 is positioned.

The side plate 29 is a standing wall that is fixed to the XY stage 25. The linear guide 28 is fixed to the side plate 29.

The holder main body 22a is fixed to linear movement blocks 28b and 28c of the linear guide 28. The linear movement blocks 28b and 28c are engaged with the linear rail 28a so as not to detach from the linear rail 28a. The linear movement blocks 28b and 28c are capable of moving freely on the linear rail 28a, along the driving direction.

As shown in FIG. 2, the linear guide 28 includes the linear rail 28a and the linear movement blocks 28b and 28c. The linear rail 28a is fixed to the side plate 29. The linear movement blocks 28b and 28c are engaged with the linear rail 28a so as to be capable of moving in relation to the linear rail 28a.

Figure 5:
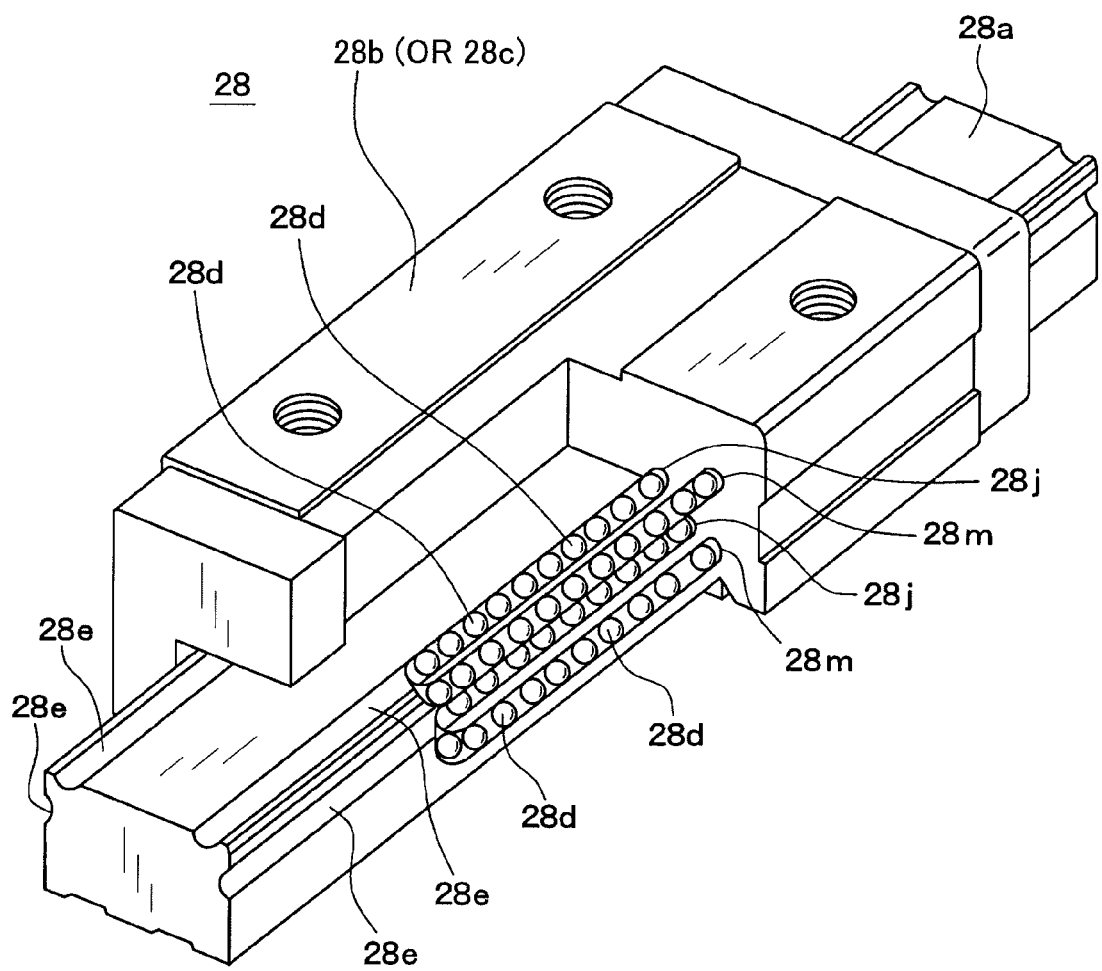
FIG. 5 is a configuration diagram of a linear guide.

FIG. 5 shows a partial perspective view of the linear guide 28. In the perspective view, only the linear movement block 28b of the linear movement blocks 28b and 28c is shown. However, the linear movement block 28c also has the same configuration as that of the linear movement block 28b.

The linear movement blocks 28b and 28c are attached to the linear rail 28 so as to be capable of sliding in the driving direction, with numerous spherical balls 28d (corresponding to an example of a rolling element) therebetween. The linear rail 28a is a track member. The linear rail 28a is a long member of which the shape of a cross-section perpendicular to the length direction (corresponding to the driving direction) is rectangular. In corner portions of the linear rail 28*a* on the linear movement blocks 28*b* and 28*c* side, four ball rolling grooves 28*e* are formed over the overall length of the linear rail 28*a*. The four ball rolling grooves 28*e* serve as tracks when the balls 28*d* roll. The ball rolling grooves 28*e* extend linearly in the length direction.

Four ball rolling grooves 28*j* are also formed in each of the linear movement blocks 28*b* and 28*c*. The ball rolling grooves 28*j* respectively correspond to the ball rolling grooves 28*e*. The plurality of balls 28*d* are sandwiched between the ball rolling grooves 28*e* in the linear rail 28*a* and the ball rolling grooves 28*j* in the linear movement blocks 28*b* and 28*c*. Furthermore, four rows of return paths 28*m* are formed in the linear movement blocks 28*b* and 28*b*. The return paths 28*m* respectively extend parallel with the ball rolling grooves 28*j* The linear movement blocks 28*b* and 28*c* are also provided with turnabout paths. Each turnabout path connects a return path 28*m* and a ball rolling groove 28*j*.

Figure 6:
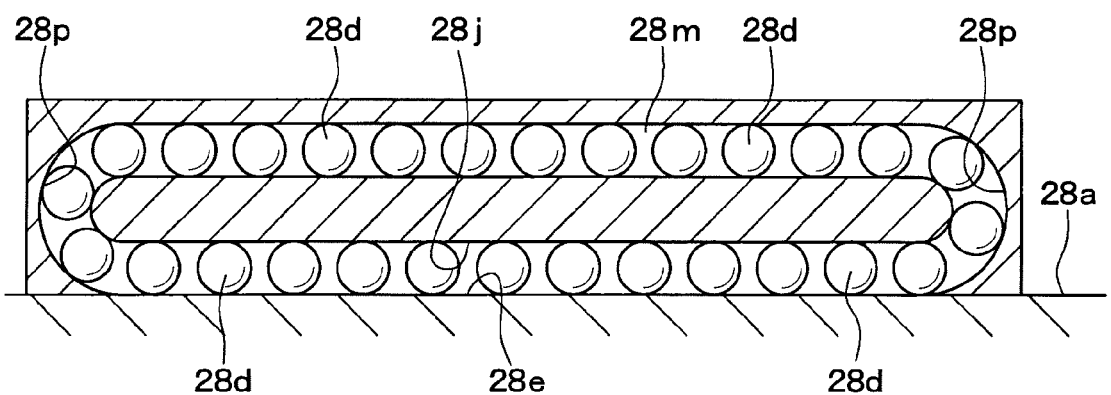
FIG. 6 is a cross-sectional view of an infinite circulation path in the linear guide, along an extending direction of the infinite circulation path.

FIG. 6 shows a cross-sectional view of an infinite circulation path. The infinite circulation path is configured by a combination of a single ball rolling groove 28*e*, a single ball rolling groove 28*j*, a single return path 28*m*, and two turnabout paths 28*p*. The two turnabout paths 28*p* connect the ball rolling grooves 28*e* and 28*j* and the return path 28*m*.

Each infinite circulation path is loaded with numerous balls 28*d*. The balls 28*d* are in a single row so as to be capable of coming into contact with and separating from each other. In addition, the infinite circulation path is filled with a lubricating oil. In general, when the linear movement blocks 28*b* and 28*c* move relative to the linear rail 28*a*, each ball 28*d* rolls through the infinite circulation path, thereby moving and circulating, while receiving load. FIG. 5 shows the arrangement of the infinite circulation path and the balls 28*d*. A portion of the linear movement block 28*b* is omitted in FIG. 5.

According to the present embodiment, the diameters of the balls 28*d* in the linear guide 28 are the same 1 mm. However, there may be individual differences in the diameters of the balls 28*d*.

An operation of the electrical discharge machine 1 configured as described above, and a machining method using the electrical discharge machine 1 will hereinafter be described.

First, the workpiece 24 is placed on the XY stage 25. The workpiece 24 according to the present embodiment is a member that serves as a base for a nozzle body of a fuel injection nozzle. The fuel injection nozzle injects fuel (such as gasoline fuel or diesel fuel) into a cylinder of an engine. The workpiece 24 is a member that has an outer appearance of a nozzle body. However, the workpiece 24 may be a member that serves as a base for another machined object.

In the electrical discharging performed using the electrical discharge machine 1, a step of generating electrical discharge between the electrode 23 and the workpiece 24 and forming a single spray hole in the workpiece 24 is performed. The step is repeatedly performed while changing, as appropriate, the X axis direction position and the Y axis direction position of the XY stage 25 each time a single spray hole is formed. As a result, a plurality of spray holes for injecting fuel are formed in a plurality of positions in the workpiece 24. As a result of these spray holes being formed, the workpiece 24 becomes a completed nozzle body. Therefore, the method for machining the workpiece 24 using electrical discharge is also a method for manufacturing a nozzle body (corresponding to an example of a workpiece).

An operator places the workpiece 24 on the XY stage 25. Then, the operator operates the discharge power supply 3. The discharge power supply 3 then starts to apply a pulse voltage between the electrode 23 and the workpiece 24 at a predetermined cycle (such as a cycle of several ten millionth of a second).

In addition, the operator operates the discharge state detection circuit 3, the position detection circuit 5, the motor amplifier 6, and the control circuit 7. Then, the discharge state detection circuit 4 starts to output the discharge state signal to the control circuit 7. The discharge state signal indicates the discharge state (such as the discharge current or the discharge voltage) between the electrode 23 and the workpiece 24. In addition, the position detection circuit 5 starts to output the position signal to the control circuit 7. The position signal indicates the position in the driving direction of the electrode holder 22.

In addition, the control circuit 7 is started. The control circuit 7 starts to perform a position control process based on the received discharge state signal. The control circuit 7 performs the position control process to output the electrode driving signal to the motor amplifier 6 so that the distance between the electrode 23 and the workpiece 24 becomes a distance appropriate for electrical discharging. Then, the motor amplifier 6 drives the ultrasonic motor 21 based on the electrode driving signal received from the control circuit 7.

Figure 7:
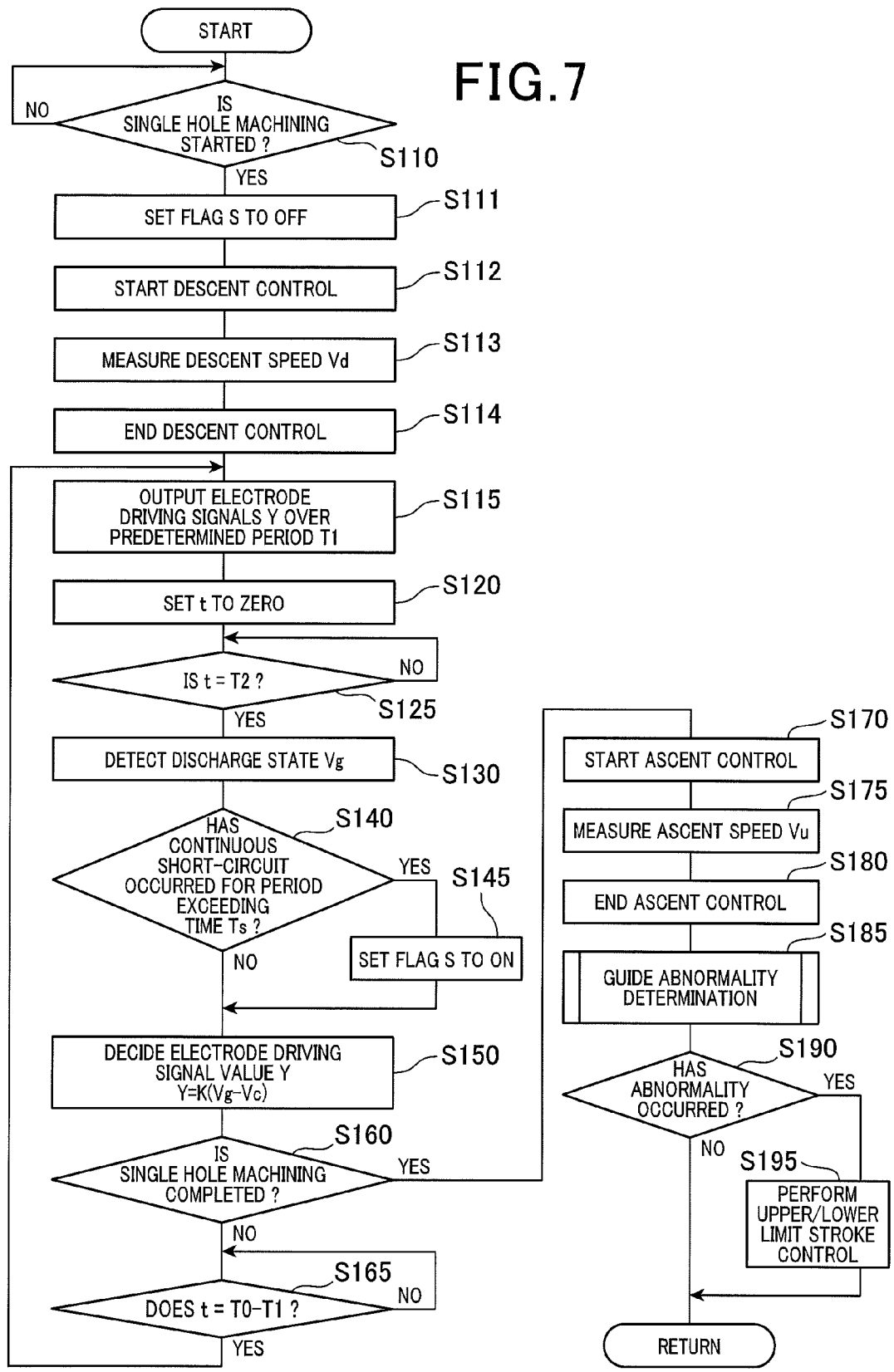
FIG. 7 is a flowchart of a position control process.
Figure 8:
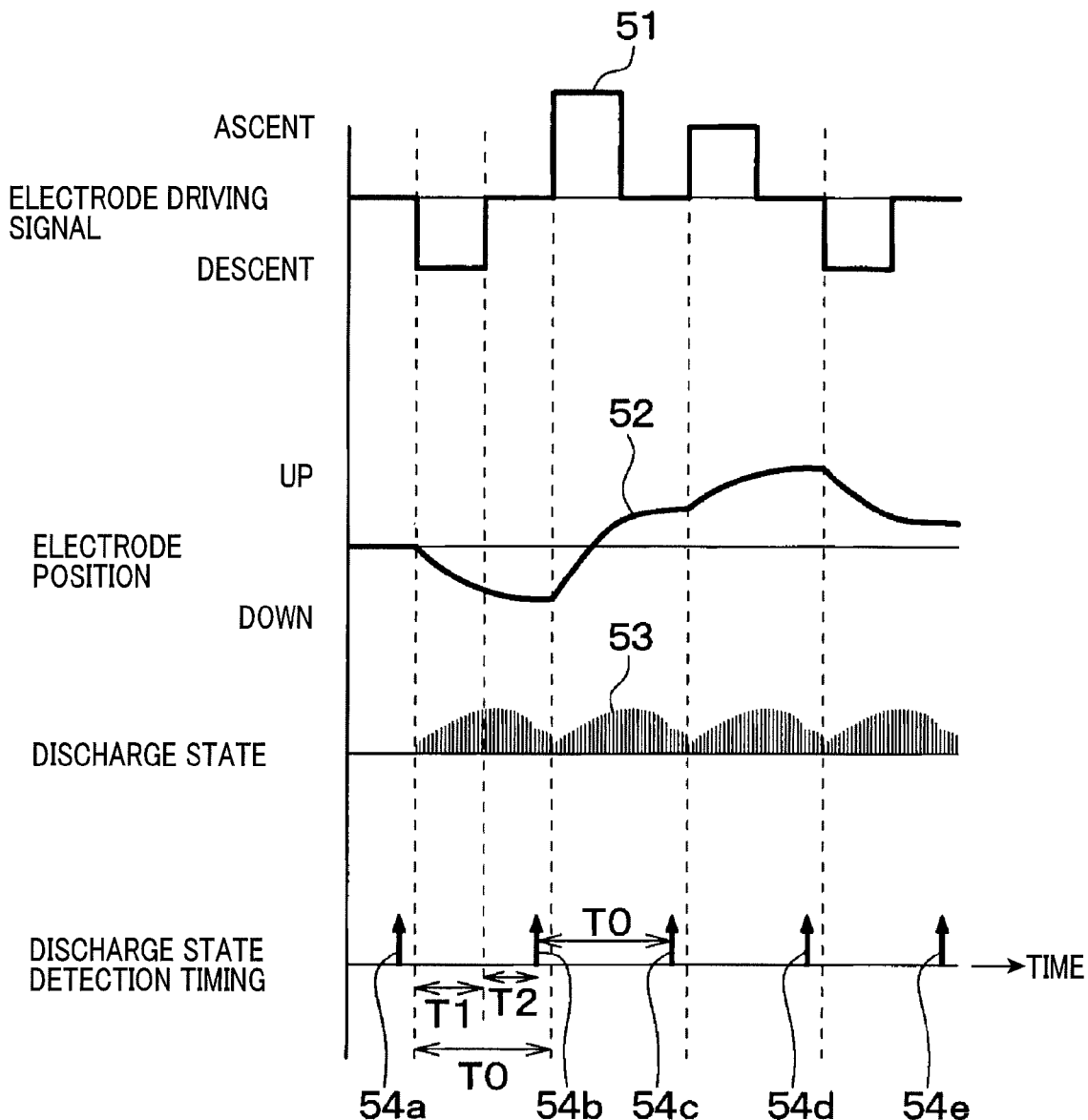
FIG. 8 is a timing chart showing the changes over time in an electrode driving signal, an electrode position, a discharge state, and the like when a single spray hole is machined by electrical discharging.

Here, the details of the position control process performed by the control circuit 7 will be described with reference to FIGS. 7 to 11. FIG. 7 is a flowchart of the position control process performed by the control circuit 7. FIG. 8 is a timing chart that shows the changes over time in the electrode driving signal, the electrode position, the discharge state, and the discharge state detection timing during electric discharging.

In the position control process, first, at step S110, the control circuit 7 determines whether or not machining of a new single spray hole is started. The control circuit 7 makes the determination based on, for example, the operator performing a predetermined start operation in the electric discharge machine 1. The control circuit 7 repeatedly performs the determination until determined that machining is started.

When determined that the machining of a new single spray hole is started, the control circuit 7 then performs a single hole machining preparation process (steps S111 to S114). Specifically, first, the control circuit 7 proceeds to step S111. The control circuit 7 resets a flag S to OFF. The flag S relates to short-circuiting between the electrode 23 and the workpiece 24. The flag S is data held in a memory (such as the RAM) of the control circuit 7.

Next, at step S112, the control circuit 7 starts descent control to lower the electrode holder 22 downwards (corresponding to the first direction) in the driving direction from a predetermined original position (home position) to a predetermined machining start position. Specifically, the control circuit 7 starts to output, to the motor amplifier 6, the electrode driving signal for lowering the electrode holder 22. The machining start position is a position set in advance as a position at which electrical discharging is able to be started between the electrode 23 and the workpiece 24 (specifically, a position at which the lower end of the electrode 23 nears the top surface of the workpiece 24 so as to enable electrical discharging).

The motor amplifier 6, which has received the electrode driving signal, elliptically moves the fingertip 21*a* of the ultrasonic motor 21. The motor amplifier 6 moves the fingertip 21*a* at a speed proportionate to the absolute value of the level of the electrode driving signal. The direction of the elliptical movement is the direction for raising the electrode holder 22 when the level of the electrode drive signal is positive (in other words, counter-clockwise in FIG. 3). The direction of the elliptical movement is the direction for lowering the electrode holder 22 when the level of the electrode drive signal is negative (in other words, clockwise in FIG. 4). The level of the electrode driving signal of which output is started at step S112 is a negative value. Therefore, the electrode holder 22 and the electrode 23 starts to descend along the driving direction so as to approach the workpiece 24.

Next, at step S113, the control circuit 7 measures the descent speed Vd (corresponding to an example of a first movement speed) of the electrode holder 22 and the electrode 23 based on the position signal from the position detection circuit 5. The descent speed Vd is measured only during a predetermined descent period. During this descent period as well, the control circuit 7 continues to output the electrode drive signal to the motor amplifier 6 and continues to lower the electrode holder 22 and the electrode 23. The descent speed Vd may be an average value, a maximum value, a minimum value, or a mode value of the movement speed of the electrode holder 22 during the predetermined descent period. However, the descent speed Vd is calculated as a positive value. In other words, the descent speed Vd is a statistical representative value of the descent speed of the electrode holder 22 during the predetermined descent period.

The predetermined descent period is a period of which the length is set in advance as a period during which the electrode holder 22 starts to move from the original position and has not yet reached the machining start position. For example, the predetermined descent period may be a period that is half the amount of time required for the electrode holder 22 to reach the machining start position after starting to move from the original position.

Next, at step S114, the control circuit 7 waits for the electrode holder 22 to reach the machining start position, based on the position signal outputted from the position detection circuit 5. When detected that the electrode holder 22 has reached the machining start position, the control circuit 7 ends the output of the electrode driving signal (the electrode driving signal to lower the electrode holder 22), thereby ending descent control. As a result, the electrode holder 22 and the electrode 23 temporarily stop descending.

During the period from the start of descent control at step S112 to the end of descent control at step S114, the level of the electrode driving signal may be kept constant. By keeping the level constant, the frequency of the elliptical movement of the fingertip 21a is controlled so as to be fixed. As a result, the descent speed of the electrode holder 22 and the electrode 23 is also controlled so as to be fixed. Therefore, during this period, there is little acceleration or deceleration of the electrode holder 22 and the electrode 23. Therefore, the descent speed Vd more clearly reflects the effects of sliding resistance in the linear guide 28. However, the level of the electrode driving signal may be changed during the period from the start of descent control at step S112 to the end of descent control at step S114.

Next, at step S115, the control circuit 7 continues to output the electrode driving signal 51 (see FIG. 8) to the motor amplifier 6, over a fixed period T1. At the first step S115 after the start of the position control process, the level Y of the outputted electrode driving signal is a default value Y0 (Y0 is a negative value) recorded in the ROM. In the present example, because step S115 is the first after the start of the position control process, the electrode driving signal of which the level is the default value Y0 is outputted to the motor amplifier 6 over the fixed period T1.

The motor amplifier 6 receives the electrode driving signal that has the level Y0, such as that described above, over the fixed period T1. The motor amplifier 6 elliptically moves the fingertip 21a of the ultrasonic motor 21 at a speed proportionate to the absolute value of the level Y0. The direction of the elliptical movement changes depending on whether the level of the electrode driving signal is positive or negative, as described above. The level Y0 in this instance is a negative value. Therefore, the position 52 in the driving direction of the electrode holder 22 and the electrode 23 descends by a distance substantially proportionate to the level Y0, so as to approach the workpiece 24.

The discharge power supply 3 continues to repeatedly apply the pulse voltage between the electrode 23 and the workpiece 24 even during the output of the electrode driving signal 51. The interval T0 of the output timing of the electrode driving signal 51 is significantly longer than the interval of the timing for applying the pulse voltage. For example, the interval T0 is 0.5 ms. During the interval T0 of the output timing of the electrode driving signal 51, the pulse voltage is applied about ten thousand times. Each time the pulse voltage is applied, electrical discharge is generated in the discharge state 53 based on the distance from the workpiece 24 to the electrode 23 or the like (electrical discharge may not be generated depending on the distance or the like).

When output of the electrode driving signal 51 over the fixed period T1 is completed, next, at step S120, the control circuit 7 resets a timer value t to zero. The timer value t changes based on the elapse of time. Next, at step S125, the control circuit 7 waits until the timer value t reaches T2 (in other words, from timing 54a to timing 54b during which the period T2 elapses after completion of the continuous output of the electrode driving signal 51). When period T2 is reached, the control circuit 7 then proceeds to step S130. Even while the control circuit 7 is waiting for the timer value t to reach T2, the discharge power supply 3 continues to repeatedly apply the pulse voltage between the electrode 23 and the workpiece 24, in the same manner as during the output of the electrode driving signal 51.

In addition, while the control circuit 7 is waiting for the timer value t to reach T2, the electrode driving signal 51 is not outputted to the motor amplifier 6. Therefore, the motor amplifier 6 does not drive the ultrasonic motor 21. However, the movement speed of the electrode holder 22 and the electrode 23 up to this point does not suddenly become zero, due to inertia, and then, the electrode holder 22 and the electrode 23 continues to advance in the same movement direction, while decelerating due to friction with the fingertip 21a. At this time, if the movement speed becomes zero before the period T2 elapses, the movement speed remains zero even when the period T2 elapses.

At step S130, the control circuit 7 detects the discharge state 53 between the electrode 23 and the workpiece 24 at this current time, or in other words, at the time at which the movement speed of the electrode 23 has decreased to a certain extent. The control circuit 7 detects the discharge state 53 based on the discharge state signal received from the discharge state detection circuit 4. The discharge state 53 between the electrode 23 and the workpiece 24 at the current time may be an amount based on either or both of the discharge voltage Vg and the discharge current received from the discharge state detection circuit 4.

Alternatively, the discharge state 53 between the electrode 23 and the workpiece 24 at the current time may be an amount based on either or both of the average value Vg of the discharge voltage or the average value of the discharge current during a period from the current point to a point going back a predetermined amount of time. As the predetermined amount of time, all that is required is that the time does not go back to the timing at which the most recent output of the electrode driving signal 51 has ended (in other words, the timing at which the electrode 23 starts decelerating). For example, if the predetermined amount of time is half of the period T2 or shorter, the predetermined amount of time is more preferable because the movement speed of the electrode 23 is considered to have sufficiently decreased.

Next, at step S140, the control circuit 7 determines whether or not the electrode 23 and the workpiece 24 are short-circuited and the period of continuous short-circuit exceeds a reference time Ts, based on the discharge state 53 acquired the most recent step S130 and previously performed step S130.

Here, the reference time Ts is, for example, 50 ms. When the reference time Ts is 50 ms and the detection interval T0 of the discharge state signal is 0.5 ms, the period of continuous short-circuit is determined to exceed the reference time Ts when the number of times a short-circuit discharge state signal is continuously acquired exceeds 100 times.

Figure 9:
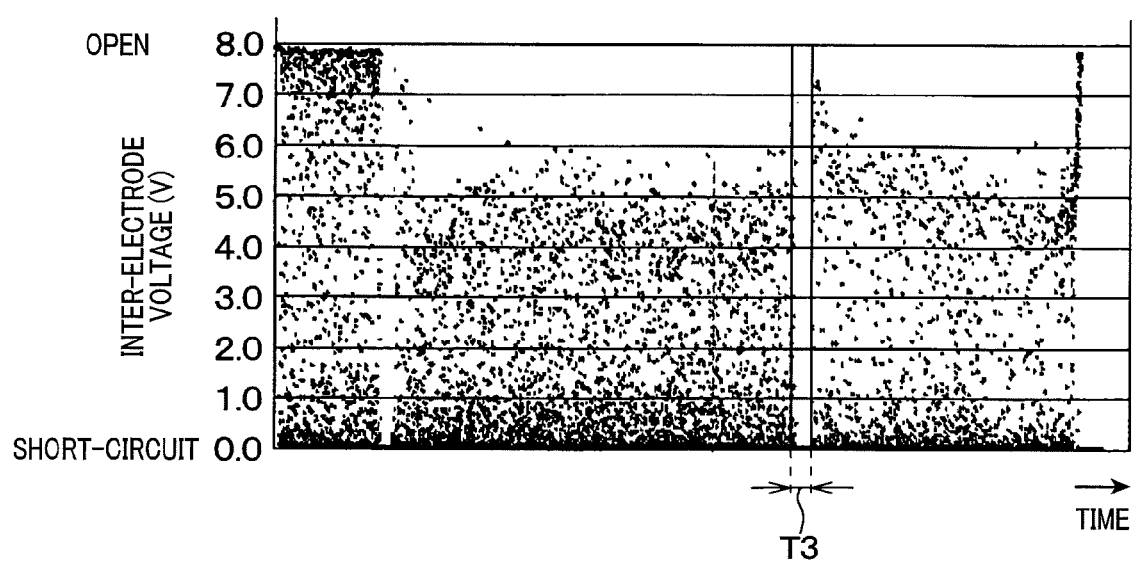
FIG. 9 is a graph of an example of transition over time in a discharge state.

As shown in FIG. 9, the discharge state 53 is a voltage value based on the discharge voltage Vg received from the discharge state detection circuit 4 at each time point. The discharge state 53 may indicate a longer distance between the electrode 23 and the workpiece 24 as the voltage value increases.

In this instance, when the voltage value becomes a maximum value (8.0 V), no current flows between the electrode 23 and the workpiece 24. In other words, electrical discharge is not generated between the electrode 23 and the workpiece 24. When the voltage value becomes a minimum value (0.0 V), the electrode 23 and the workpiece 24 are in a short-circuited state.

When determined that the electrode 23 and the workpiece 24 are short-circuited and the period of continuous short-circuit exceeds the reference time Ts, the control circuit 7 proceeds to step S145. When determined otherwise, the control circuit 7 bypasses step S145 and proceeds to step S150. At step S145, the control circuit 7 sets the flag S to ON and subsequently proceeds to step S150.

At step S150, the control circuit 7 decides the level Y of the electrode driving signal 51 based on the discharge state detected at step S130. For example, the level Y is decided using an equation $Y=K(Vg-Vc)$, described above. The level Y of the electrode driving signal 51 that has been decided in this way is the level of the electrode driving signal 51 that is continuously outputted next. Control coefficient K is a negative value. The control coefficient K prescribes the proportional relationship between the deviation of the discharge state detected at step S130 in relation to an ideal discharge state, and the level Y of the electrode driving signal 51 based on the deviation. The control coefficient K is determined in advance as a fixed value. In addition, Vc is a positive value that is determined in advance as the voltage level of the discharge state signal corresponding to the ideal discharge state.

The level Y of the electrode driving signal that is to be outputted next to the motor amplifier 6 is decided using a method such as this. Therefore, for example, when the distance between the electrode 23 and the workpiece 24 at the current point is longer than the distance for actualizing the ideal electrical discharge, the level Vg of the discharge state becomes higher than the reference level Vc. Therefore, the value of the level Y of the electrode driving signal is calculated as a negative value. As a result, at the next step S115, the control circuit 7 performs control so as to lower the electrode holder 22 and the electrode 23.

In addition, for example, when the distance between the electrode 23 and the workpiece 24 at the current point is shorter than the distance for actualizing the ideal discharge, the level Vg of the discharge state becomes lower than the reference level Vc. Therefore, the value of the level Y of the electrode driving signal is calculated as a positive value. As a result, at the next step S115, the control circuit 7 performs control so as to raise the electrode holder 22 and the electrode 23.

In particular, when the electrode 23 and the workpiece 24 are short-circuited at the current point, the level Vg of the discharging state becomes zero. Therefore, the value of the level Y of the electrode driving signal is calculated as the maximum value. As a result, at the next step S115, the control circuit 7 performs control so as to raise the electrode holder 22 and the electrode 23 to maximum height.

The distance over which the electrode holder 22 is moved at the next step S115 based on the level Y decided at step S150 is several μm at maximum. The distance is significantly shorter than the diameter of the ball 28d.

Next, at step S160, the control circuit 7 determines whether or not machining of the spray hole that is the current machining subject is completed. For example, when determined that the electrode 23 has passed through the workpiece 24 based on the discharge state signal from the discharge state detection circuit 4, the control circuit 7 may determine that machining of the spray hole that is the current machining subject is completed. Alternatively, when determined that the electrode holder 22 has reached a predetermined machining completed position based on the position signal from the position detection circuit 5, the control circuit 7 may determine that the machining of the spray hole that is the current machining subject is completed.

When determined that the electrode holder 22 has not reached the predetermined machining completed position, the control circuit 7 subsequently performs step S165. When determined that the electrode holder 33 has reached the predetermined machining completed position, the control circuit 7 proceeds to step S170 to return the electrode 23 to the original position.

At step S165, the control unit 7 waits until the timer value t reaches time (T0−T1). Time T1 is the period over which a single output of the electrode driving signal 51 is sustained. Therefore, the elapse of time (T0−T1) from the end of the previous output of the electrode driving signal 51 indicates the elapse of output cycle T0 of the electrode driving signal 51 from the start timing of the previous output of the electrode driving signal 51. When the timer value t reaches time (T0−T1), the control circuit 7 returns to step S115 again. The control circuit 7 continues to output, to the motor amplifier 6, the electrode driving signal 51 that has the level Y decided at the most recent step S150 for the fixed period T1.

As a result of subsequently repeatedly performing the loop from steps S115 to S165, such as those described above, the control circuit 7 repeatedly performs the following operations (A), (B), and (C) in this order, as shown in FIG. 8.

(A) The control circuit 7 outputs the electrode driving signal 51 at the fixed cycle T0 and drives the electrode 23

(step S115). After completing the output of the electrode driving signal 51, when the predetermined time T2 has elapsed (step S125), the control circuit 7 detects the discharge state (step S130).

(B) Only when short-circuit continues over the reference time Ts based on the detected discharge state (step S140), the control circuit 7 changes the state of the flag S to ON (step S145).

(C) The control circuit 7 decides the level Y of the electrode driving signal 51 based on the detected discharge state (step S150), and outputs the next electrode driving signal 51 (step S165) as the electrode driving signal 51 that has the decided level Y.

The cycle of the detection timing of the discharge state at step S130 is also T0.

The timing for detection of the discharge state, as described above is the timing at which the ultrasonic motor 21 is not operating, the electrode 23 is not being driven, and the movement speed of the electrode 23 has weakened due to inertia. However, as another example, the timing for detection of the discharge state may be the timing at which the ultrasonic motor 21 is operating and the electrode 23 is being driven.

In addition, when determined that the electrode holder 22 has reached the predetermined machining completed position at step S160 as described above, or in other words, when the machining of a single spray hole is completed, the control circuit 7 proceeds to step S170. At steps 170 to 195, the control circuit 7 preforms a single hole post-machining process. Specifically, first, at step S170, the control circuit 7 performs ascent control to raise the electrode holder 22 in the upward driving direction (corresponding to an example of the second direction) from the current position (such as the machining completed position) to the original position. Specifically, the control circuit 7 starts to output, to the motor amplifier 6, the electrode driving signal for raising the electrode holder 22.

The motor amplifier 6, which has received the electrode driving signal, elliptically moves the fingertip 21a of the ultrasonic motor 21. The motor amplifier 6 moves the fingertip 21a at a speed proportionate to the absolute value of the level of the electrode driving signal. Because the level of the electrode driving signal is positive, the direction of the elliptical movement is the direction for raising the electrode holder 22 (in other words, counter-clockwise in FIG. 3). Therefore, the electrode holder 22 and the electrode 23 start to ascend along the driving direction so as to move away from the workpiece 24.

Next, at step S175, the control circuit 7 measures the ascent speed Vu (corresponding to an example of a second movement speed) of the electrode holder 22 and the electrode 23 based on the position signal from the position detection circuit 5. The ascent speed Vu is measured only during a predetermined ascent period. During this ascent period as well, the control circuit 7 continues to output the electrode drive signal to the motor amplifier 6 and continues to raise the electrode holder 22 and the electrode 23. The ascent speed Vu may be an average value, a maximum value, a minimum value, or a mode value of the movement speed of the electrode holder 22 during the predetermined ascent period. However, the ascent speed Vu is calculated as a positive value. In other words, the ascent speed Vu is a statistical representative value of the ascent speed of the electrode holder 22 during the predetermined ascent period.

The predetermined ascent period is a period of which the length is set in advance as a period during which the electrode holder 22 starts to move from the original position and has not yet reached the machining start position. For example, the predetermined ascent period may be a period that is half the amount of time required for the electrode holder 22 to reach the machining start position after starting to move from the original position.

Next, at step S180, the control circuit 7 waits until the electrode holder 22 reaches the original position based on the position signal outputted from the position detection circuit 5. When detected that the electrode holder 22 has reached the original position, the control circuit 7 ends the output of the electrode driving signal (the electrode driving signal to raise the electrode holder 22), thereby ending ascent control. As a result, the electrode holder 22 and the electrode 23 temporarily stop ascending.

During the period from the start of ascent control at step S170 to the end of ascent control at step S180, the level of the electrode driving signal may be kept constant. By keeping the level constant, the frequency of the elliptical movement of the fingertip 21a is controlled so as to be fixed. As a result, the ascent speed of the electrode holder 22 and the electrode 23 is also controlled so as to be fixed. Therefore, during this period, there is little acceleration or deceleration of the electrode holder 22 and the electrode 23. Therefore, the ascent speed Vu more clearly reflects the effects of sliding resistance in the linear guide 28. However, the level of the electrode driving signal may be changed during the period from the start of ascent control at step S170 to the end of ascent control at step S180.

Next, at step S185, the control circuit 7 performs a guide abnormality determination process. In the guide abnormality determination process, the control circuit 7 determines whether or not a guide abnormality has occurred. The guide abnormality is when the sliding resistance in the linear guide 28 has become excessively greater than that during an ordinary state.

At step S190, the control circuit 7 determines whether or not a guide abnormality has occurred based on the result of the guide abnormality determination process at step S185. When determined that a guide abnormality has occurred, the control circuit 7 performs upper/lower limit stroke control at step S195. The control circuit 7 then returns to step S110 to machine the next spray hole. When determined that a guide abnormality has not occurred, the control circuit 7 bypasses step S195 and returns to step S110 to machine the next spray hole. Details of the upper/lower limit stroke control at step S195 will be described hereafter.

As described above, when machining a plurality of spray holes in a single workpiece 24, or when machining a plurality of spray holes in a plurality of workpieces 24, the control circuit 7 performs the position control process shown in FIG. 7. In the position control process, the control circuit 7 performs the single hole machining preparation process (steps 111 to 114), then the actual machining process (steps 115 to 165), and then the single hole post-machining process (steps 170 to 195) when machining each hole (step S110).

In the single hole machining preparation process, the control circuit 7 lowers the electrode holder 22 from the original position to the machining start position. In addition, the control circuit 7 detects the movement speed Vd of the electrode holder 22 during the above-described predetermined descent period.

In addition, in the actual machining process, the control circuit 7 generates electrical discharge between the workpiece 24 and the electrode 23. The control circuit 7 advances boring of the spray hole in the workpiece 24 while melting the workpiece 24 by the electrical discharge. Then, in the actual machining process, when the electrode 23 and the electrode holder 22 and the workpiece 24 are short-circuited over a period longer than the reference time Ts (step S140), the control circuit 7 sets the flag S to ON (step S145).

As described above, when short-circuit occurs even once during the actual machining process, the control circuit 7 performs control to move the electrode holder 22 in the direction separating the electrode 23 from the workpiece 24 at step S150 at this time. Therefore, ordinarily, a short-circuit state is not continuously detected numerous times during repetitions of step S130. Continuous detection numerous times of the short-circuit state indicates that the sliding resistance in the linear guide 28 has increased. The probability is high that the linear movement blocks 28b and 28c are having difficulty moving over the linear rail 28a.

In addition, in the single hole post-machining process, the control circuit 7 raises the electrode holder 22 from the machining completed position to the original position. In addition, the control circuit 7 detects the movement speed Vu of the electrode holder 22 during the above-described predetermined ascent period. The control circuit 7 subsequently performs the upper/lower limit stroke if an abnormality has occurred, based on the result of the guide abnormality determination process.

When the electrode holder 22 moves in the driving direction in any of the above-described single hole machining preparation process, actual machining process, and single hole post-machining process, the linear movement blocks 28b and 28c move integrally with the electrode holder 22 along the linear rail 28a at all times. As a result of the movement of the linear movement blocks 28b and 28c along the linear rail 28a, the linear guide 28 guides the movement of the electrode holder 22 in the driving direction.

Here, an example in which the operator machines a plurality of spray holes in a single workpiece 24 or an example in which the operator machines a plurality of spray holes in a plurality of workpieces 24 using the electrical discharge machine 1 will be described with reference to FIG. 10.

Figure 10:
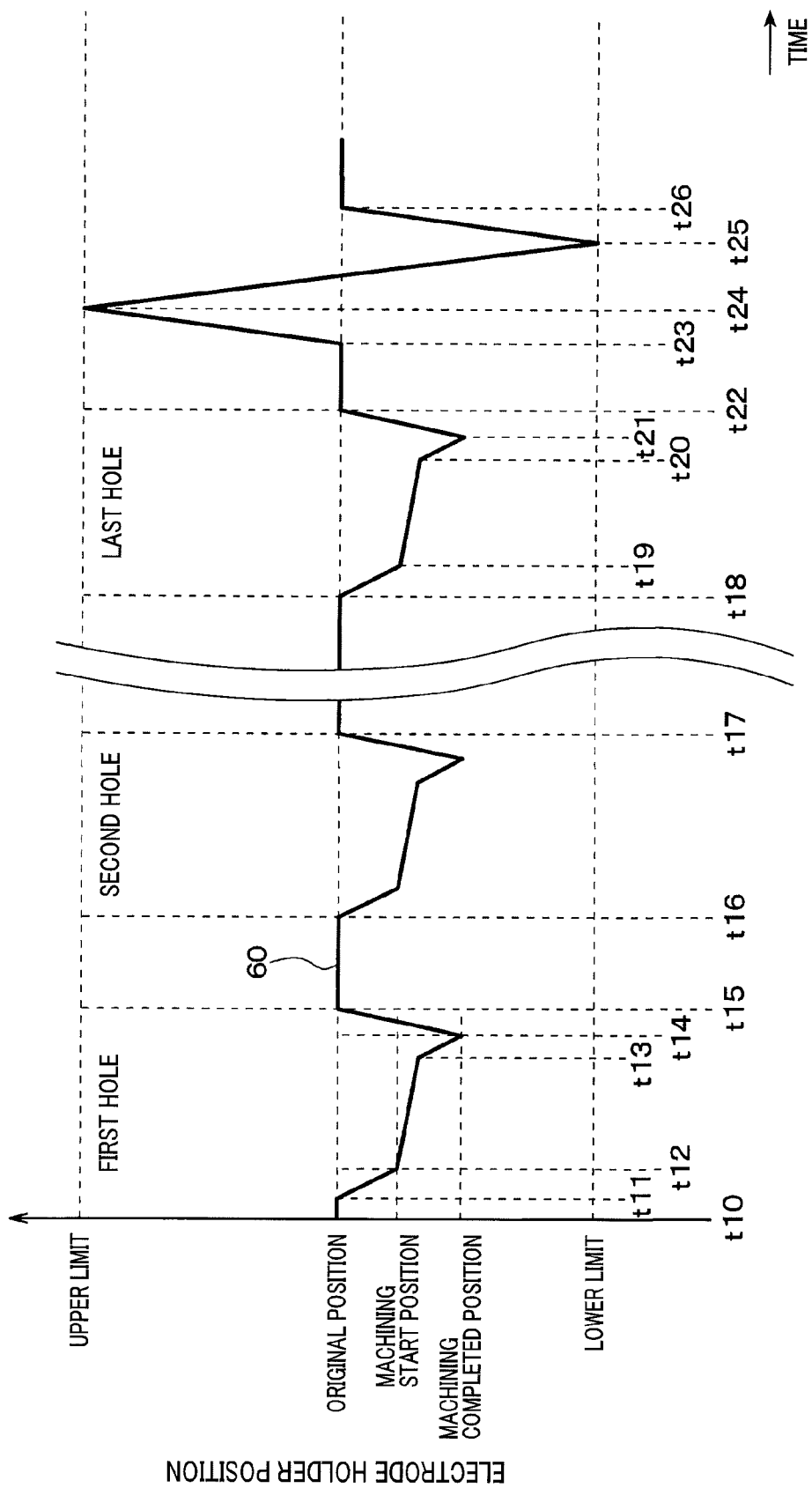
FIG. 10 is a graph of an example of changes in the position of an electrode holder when a plurality of spray holes are machined.

As shown in FIG. 10, when machining a first hole, first, at time t10, the operator sets the workpiece 24 on the XY stage 25 as shown in FIG. 1. The operator then operates the discharge power supply 3, the discharge state detection circuit 4, the position detection circuit 5, the motor amplifier 6, and the control circuit 7.

Then, at time t11, the operator performs a predetermined starting operation in the electrical discharge machine 1. The control circuit 7 then proceeds from steps 110 to 111 and performs the single hole machining preparation process. Then, as indicated by a solid line 60 in FIG. 10, the position of the electrode holder 22 descends from the original position to the machining start position at a fixed speed that is higher than the speed during actual machining.

Then, when the electrode holder 22 reaches the machining start position at time t12, the control circuit 7 ends the single hole machining preparation process and starts the actual machining process. The amount of time required from time t11 to time t12 is, for example, 0.5 seconds.

After time t12, the spray hole in the workpiece 24 is slowly bored by the electrode 23. At time t13, the electrode 23 passes through the workpiece 24. At the following time t14, the control circuit 7 determines that the machining of the current spray hole is completed at step S160. The control circuit 7 ends the actual machining process. The amount of time required from t12 to time t14 is, for example, 10 to 30 seconds.

Here, it is assumed that short-circuit over a period exceeding the reference time Ts has not occurred during machining of the first spray hole. Therefore, during the period from time t12 to time t14, the control circuit 7 bypasses steps 140 to 145 at all times and proceeds to step S150. Therefore, the flag S remains OFF at time t14.

After time t14, the control circuit 7 proceeds to step S170 and performs the single hole post-machining process. Then, as described above, as indicated by the solid line 60 in FIG. 10, the position of the electrode holder 22 ascends from the machining completed position to the original position at a fixed speed that is higher than the speed during actual machining.

Figure 11:
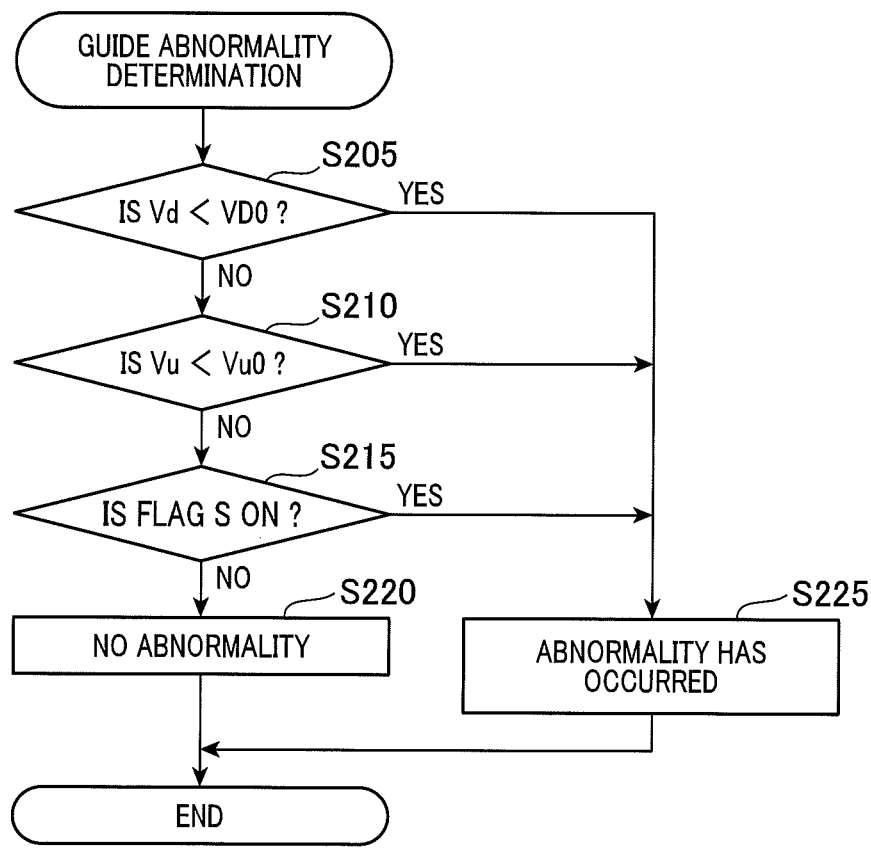
FIG. 11 is a flowchart of a guide abnormality determination process according to a first embodiment.

When the electrode holder 22 reaches the original position at time t15, the control circuit 7 performs the guide abnormality determination at step S185. As shown in FIG. 11, in the guide abnormality determination, first, at step S205, the control circuit 7 determines whether or not the descent speed Vd (positive value) measured at the most recent step S113 is lower than a predetermined descent reference speed Vd0 (corresponding to an example of a first reference speed). Then, when determined that the descent speed Vd is lower than the descent reference speed Vd0 (positive value), the control circuit 7 proceeds to step S225. The control circuit 7 determines that a guide abnormality has occurred and ends the guide abnormality determination. In addition, when determined that the descent speed Vd is the descent reference speed Vd0 or higher, the control circuit 7 proceeds to step S210.

Ordinarily, when the linear movement blocks 28b and 28c move, the balls 28 rotate within the linear guide 28, thereby rolling through the space. As a result, the sliding resistance between the linear rail 28, and the linear movement blocks 28b and 28c is reduced. The reduction in sliding resistance is achieved by the resistance reducing effect of the rolling of the balls 28. In addition, the reduction in sliding resistance is also achieved by the effect of the movement of the lubricating oil within the infinite circulation path accompanying the rolling of the balls 28d (rolling movement), thereby enabling the lubricating oil to be evenly spread over the infinite circulation path.

However, as described above, the distance over which the electrode holder 22 moves at step S115 during the actual machining process (in other words, the movement distance of the linear movement blocks 28b and 28c) is several μm at maximum, whereas the diameter of the balls 28d within the linear guide 28 is large, at about 1 mm. Therefore, the balls 28 move while minutely vibrating at a high frequency, without rolling. In addition, the variations in the movement amount of individual balls 28d increase.

Figure 12:
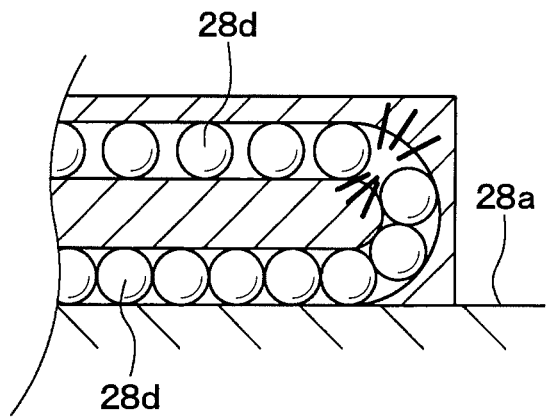
FIG. 12 is a diagram of a state in which balls are disproportionately positioned on the infinite circulation path.

When this state continues, as shown in FIG. 12, uneven positioning occurs in the distribution of the balls 28d within the infinite circulation path. In a section in which the balls 28d are concentrated, mutual contact between the balls 28d increase. As a result, due to the frictional force between the balls 28d, the sliding resistance between the linear rail 28a and the linear movement blocks 28b and 28c increases.

In addition, because the movement amount of the balls 28d is small, it becomes difficult for the lubricating oil to be spread evenly over the infinite circulation path. As a result, the balls 28d engage with each other. In addition, when the balls 28d move while minutely vibrating at a high frequency, without rolling, in a state in which the lubricating oil is not evenly spread, dust is produced as a result of the balls 28d and the infinite circulation path rubbing against each other. The dust produced by as a result engages with the balls 28d, thereby increasing the sliding resistance between the linear rail 28a and the linear movement blocks 28b and 28c. A state such as this is a state of guide abnormality in which the sliding resistance becomes excessively greater than that in an ordinary state.

When the sliding resistance between the linear rail 28a and the linear movement blocks 28b and 28c increases in this way, if the driving force of the electrode holder 22 is the same, the movement speed of the electrode holder 22 decreases. According to the present embodiment, this decrease in movement speed is used as follows. When the descent speed Vd of the electrode holder 22 is lower than the predetermined descent reference speed Vd0 during the predetermined descent period (step S205), the control circuit 7 determines that a guide abnormality has occurred (step S225). The descent reference speed Vd0 may be determined in advance to be half the presumed speed at which the electrode holder 22 descends during an ordinary single hole machining preparation process.

Next, at step S205, the control circuit 7 determines whether or not the ascent speed Vu (positive value) measured at the most recent step S175 is lower than a predetermined ascent reference speed Vu0 (corresponding to an example of a second reference speed). When determined that the ascent speed Vu is lower than the ascent reference speed Vu0 (positive value), the control circuit 7 proceeds to step S225 and determines that a guide abnormality has occurred. When determined that the ascent speed Vu is the ascent reference speed Vu0 or higher, the control circuit 7 proceeds to step S215.

In other words, as described above, the movement speed of the electrode holder 22 decreases when the sliding resistance increases. The control circuit 7 uses this fact as follows. When determined that the ascent speed Vu of the electrode holder 22 during the predetermined ascent period is lower than the predetermined ascent reference speed Vu0 (step S210), the control circuit 7 determines that a guide abnormality has occurred (step S225). The ascent reference speed Vu0 may be determined in advance to be half the presumed speed at which the electrode holder 22 ascends during an ordinary single hole machining preparation process.

Taking into consideration the gravitational force applied to the electrode holder 22 and the linear movement blocks 28b and 28c, when the absolute value of the level of the electrode driving signal outputted by the control circuit 7 is the same both during the predetermined descent period and the predetermined ascent period, the descent reference speed Vd0 is set to be higher than the ascent reference speed Vu.

In this way, the control circuit 7 compares the movement speeds Vd and Vu in the driving direction of the electrode holder 22 with the reference speeds Vd0 and Vu0, thereby determining whether or not resistance against the movement of the electrode holder 22 is abnormal.

The movement speed Vd that is compared with the reference speed Vd0 is the movement speed of the electrode holder 22 when the electrode holder 22 is moved in the direction of the workpiece 24 from the original position to start machining of a single spray hole. In addition, the movement speed Vu that is compared with the reference speed Vu0 is the movement speed of the electrode holder 22 when the electrode holder 22 is returned to the original position after machining of the same single spray hole is completed.

The steps of moving before and after the start of machining of a single spray hole are steps ordinarily present in the steps for machining Therefore, by using the movement speed at such steps for comparison, a special period for detecting the movement speed is not required to be provided.

Therefore, this leads to faster machining. In addition, the steps of moving before and after the start of machining of a single spray hole is a period during which the electrode holder can be moved over a long distance in one direction, among the machining steps for a single hole. Therefore, the movement speed during this period can be detected with high accuracy.

In addition, when at least either of the condition that the descent speed Vd is lower than the descent reference speed Vd0 and the condition that the ascent speed Vu is lower than the ascent reference speed Vu0 is met, the control circuit 7 determines that the guide abnormality has occurred even when the other condition is not met.

A reason for performing determination in this way is that, when the sliding resistance increases as a result of disproportionate positioning of the plurality of balls 28d, the movement of the electrode holder 22 does not necessarily become difficult in both the upward and downward directions. In some instances, the movement becomes difficult in only one direction. As described above, as a result of the guide abnormality being determined to have occurred when an abnormality is detected in even either of the descent speed Vd and the ascent speed Vu, situations in which the movement of the electrode holder 22 becomes difficult in only one direction can be addressed.

At step S215, the control circuit 7 determines whether or not the flag S is set to ON. When determined that the flag S is set to ON, the control circuit 7 proceeds to step S225. The control circuit 7 determines that a guide abnormality has occurred and ends the guide abnormality determination. When determined that the flag S is set to OFF, the control circuit 7 proceeds to step S220. The control circuit 7 determines that a guide abnormality has not occurred and ends the guide abnormality determination.

In this way, when the flag S is set to ON, or in other words, when the period during which the electrode 23 and the workpiece 24 are short-circuited exceeds the reference time Ts in the most recent actual machining process, the control circuit 7 determines that the resistance against the movement of the electrode holder 22 is abnormal.

When the sliding resistance between the linear rail 28a and the linear movement blocks 28b and 28c is abnormal, even when control is performed to separate the electrode 23 from the workpiece 24 during the short-circuit of the electrode 23 and the workpiece 24 are short-circuited, the electrode 23 may not separate from the workpiece 24. Therefore, as described above, whether or not the resistance against the movement of the electrode holder 23 is abnormal, or in other words, whether or not a guide abnormality has occurred can be determined based on the period during which the electrode 23 and the workpiece 24 are short-circuited.

For example, in the example in FIG. 10, during the single hole machining preparation process for machining the first hole (t11 to t12), the actual machining process (t12 to t14), and the single hole post-machining process t14 to t15, it is presumed that a guide abnormality has not occurred. In this instance, the electrode holder 22 is moved at the ordinary speed. Even when short-circuit occurs, the short-circuit is quickly resolved. Therefore, the control circuit 7 determines that the descent speed Vd is the descent reference speed Vd0 or higher at step S205 in FIG. 11 and proceeds to step S210.

Then, the control circuit 7 determines that the ascent speed Vu is higher than the ascent reference speed Vu0 at step S210 and proceeds to step S215. The control circuit 7 determines that the flag S is set to OFF at step S215 and proceeds to step S220. The control circuit 7 then determines that no abnormality has occurred. Therefore, at step S190, the control circuit 7 determines that no abnormality has occurred. The control circuit 7 bypasses step S195 and returns to step S110.

After the machining of the first spray hole has been completed, during the period from time t15 to time t16, the operator temporarily removes the workpiece 24 from the XY stage 25. Alternatively, the control circuit 7 automatically moves the XY stage 25. As a result, the workpiece 24 is moved to a position that does not obstruct the movement of the electrode 23.

Thereafter, the operator or the control circuit 7 moves the workpiece 24 so that the position in which the second spray hole is to be formed in the workpiece 24 is positioned directly below the electrode 23. Then, the operator performs the predetermined starting operation in the electrical discharge machine 1 at time t16.

The control circuit 7 then proceeds from steps 110 to 111. Control by the control circuit 7 and operation of the electrical discharge machine 1 during the subsequent period from time t16 to time t17 is the same as the control and operation from time t11 to time t15. As a result of the operator repeatedly performing such operations, the plurality of spray holes are formed in the workpiece 24.

Then, the operator moves the workpiece 24 so that the position in which the last spray hole is to be formed in the workpiece 24 is positioned directly below the electrode 23. At time t18, the operator performs the predetermined start operation in the electrical discharge machine 1. The control circuit 7 then proceeds from step S110 to S111.

Control by the control circuit 7 and operation of the electrical discharge machine 1 during the subsequent period from time t18 to time t22 is the same as the control and operation from time t11 to time t15. However, it is presumed that a guide abnormality has already occurred at time t18.

Then, it is presumed that only one of, only arbitrary two of, or all of (p), (q), and (r), below, has occurred.

(p) The descent speed Vd of the electrode holder 22 measured during the single hole machining preparation process at time t18 to time t19 is lower than the descent reference speed Vd0.

(q) Short-circuit occurs for a period exceeding the reference time Ts, as in period T3 in FIG. 9, during the actual machining period at time t19 to t21.

(r) The ascent speed Vu of the electrode holder 22 measured during the single hole post-machining process at time t21 to time t22 is lower than the ascent reference speed Vu0.

Then, in the guide abnormality determination process performed at time t22, when above-described (p) has occurred, the control circuit 7 proceeds from steps 205 to 225 and determines that a guide abnormality has occurred, even when (q) has not occurred and (r) has not occurred, at the guide abnormality determination process performed at time t22, In addition, when (p) has not occurred and (r) has occurred, the control circuit 7 proceeds from steps 210 to 225 and determines that a guide abnormality has occurred, even when (q) has not occurred.

Furthermore, when neither (p) nor (r) has occurred and (q) has occurred, the control circuit 7 proceeds from steps 215 to 225 and determines that a guide abnormality has occurred. Therefore, the control circuit 7 determines that a guide abnormality has occurred at step S190 in FIG. 7 and proceeds to step S195.

At step S195, the control circuit 7 performs the upper/lower limit stroke control. Specifically, first, the control circuit 7 waits for a predetermined wait period. During the wait period, the operator first temporarily removes the workpiece 24 from the XY stage 25. Alternatively, the operator moves the XY stage 25 and moves the workpiece 24 to a position that does not obstruct the movement of the electrode 23. Then, at time t23 when the wait period has elapsed, the electrode holder 22 is moved by a method such as that in FIG. 10.

Specifically, first, from time 23 to time t24, the control circuit 7 continues to output the maximum positive electrode driving signal to the motor amplifier 6. As a result, the motor amplifier 6 uses the ultrasonic motor 21 and continues to raise the electrode holder 22 at the maximum possible ascent speed.

Then, at time t24, the control circuit 7 detects that the electrode holder 22 has arrived at the upper limit position that is the uppermost possible in terms of capability, based on the position signal from the position detection circuit 5. Next, from time t24 to time t25, the control circuit 7 continues to output the lowest negative electrode driving signal to the motor amplifier 6. As a result, the motor amplifier 6 uses the ultrasonic motor 21 and continues to lower the electrode holder 22 at the maximum descent speed possible in terms of capability.

Then, at time t25, the control circuit 7 detects that the electrode holder 22 has arrived at the lower limit position that is the lowermost possible in terms of capability, based on the position signal from the position detection circuit 5. Next, from time t25 to time t26, the control circuit 7 continues to output the maximum positive electrode driving signal to the motor amplifier 6. As a result, the motor amplifier 6 uses the ultrasonic motor 21 and continues to raise the electrode holder 22 at the maximum ascent speed possible in terms of capability.

Then, at time t26, the control circuit 7 detects that the electrode holder 22 has reached the original position based on the position signal from the position detection circuit 5. The control circuit 7 sets the level of the electrode driving signal to zero. As a result, the motor amplifier 6 stops the operation of the ultrasonic motor 21 and stops the movement of the electrode holder 22. Upper/lower limit stroke control performed at step S195 is as described above. After step S195, the control circuit 7 returns to step S110.

In the present example, upper/lower limit stroke control is performed after the machining of the last spray hole. However, above-described (p), (r), and (q) may occur during the machining of spray holes other than the last spray hole (such as the first spray hole or the second spray hole). In this instance, during the single hole post-machining process for the hole other than the last spray hole, the control circuit 7 determines that a guide abnormality has occurred at step S190 and performs the upper/lower limit stroke at step S195, in a manner similar to that described above.

The distance from the original position to the upper limit and the distance from the original position to the lower limit are set to a movement distance of when the largest ball 28*d* having the largest diameter among all balls 28*d* included in the linear guide 28 rolls and rotates once without sliding (in other words, the length of the great circle of the largest ball 28*d*) or longer.

As a result of, the balls 28*d* rotate once or more from time t23 to time t24. The balls 28*d* then rotate twice or more from time t24 to time t25. The balls 28*d* then rotate once or more from time t25 to time t26. Therefore, the disproportionate positioning in the placement of the balls 28*d* is resolved. In addition, because the balls 28*d* move over a long distance at once, the lubricating oil is more easily evenly spread. In addition, even when dust is produced, the produced dust can be dispersed. As a result, the increase in sliding resistance between the linear rail 28a and the linear movement blocks 28b and 28c is resolved.

The amount of time from time t23 to time t26 is significantly shorter (such as 3 seconds) than the amount of time required for the actual machining process of a single spray hole.

In this way, the control circuit 7 moves the electrode holder 22 at a high speed by a distance amounting to the movement distance when the largest ball rolls and rotates once without sliding. As a result, the increase in sliding resistance between the linear rail 28a and the linear movement blocks 28b and 28c is resolved. Therefore, the movement of the electrode holder 22 becomes smooth. The amount of time required for machining the spray hole can be reduced.

In addition, in a single upper/lower limit stroke control operation, the electrode holder 22 continuously moves upwards by a distance that is the length of the great circle of the largest ball 28d or longer. In addition, the electrode holder 22 continuously moves downwards by a distance that is the length of the great circle of the largest ball 28d or longer.

Depending on the disproportionate positioning of the balls 28d, the disproportionate positioning may not be resolved merely by the electrode holder 22 being moved by a distance that is the length of the great circle of the largest ball 28d or longer, in only one direction. In such instances as well, the likelihood of the disproportionate positioning being resolved becomes higher when the electrode holder 22 is moved by a distance that is the length of the great circle of the largest ball 28d or longer, in both directions.

Second Embodiment

Next, a second embodiment of the present disclosure will be described. According to the present embodiment, the content of the guide abnormality determination process performed by the control circuit 7 at step S180 in FIG. 7 is changed from that according to the first embodiment. The guide abnormality determination process is changed from the process in FIG. 11 to the process in FIG. 13.

Figure 13:
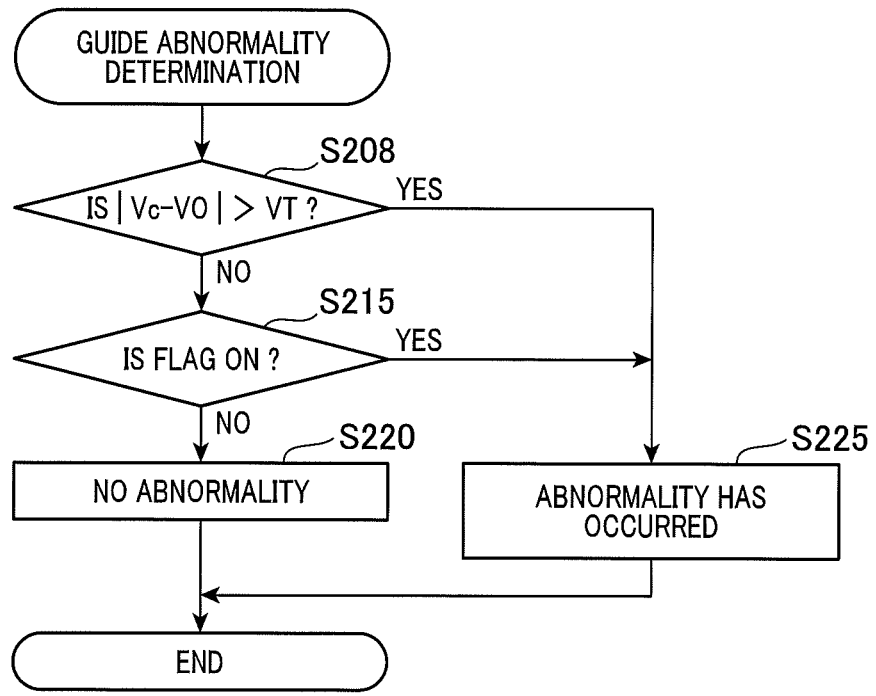
FIG. 13 is a flowchart of the guide abnormality determination process according to a second embodiment.

In the process in FIG. 13, steps S205 and S210 from the process in FIG. 11 have been replaced with step S208. At step S208, the control circuit 7 determines whether or not the absolute value of the difference between the descent speed Vd (positive value) measured at the most recent step S113 and the ascent speed Vu (positive value) measured at the most recent step S175 is greater than a predetermined reference speed difference VT.

When determined that the absolute value is greater than the reference speed difference VT, the control circuit 7 proceeds to step S225 and determines than a guide abnormality has occurred. When determined that the absolute value is the reference speed difference VT or less, the control circuit 7 proceeds to step S220 and determines that a guide abnormality has not occurred.

As a result of whether or not a guide abnormality has occurred being determined based on comparison of the descent speed Vd and the ascent speed Vu in this way, situations in which the movement of the electrode holder 22 becomes difficult in only one direction can also be addressed.

In addition, when the sliding resistance increases as a result of disproportionate positioning of the balls 28d, the resistance in relation to the downward movement and the resistance in relation to the upward movement do not become the same. Rather, the resistance in relation to the downward movement and the resistance in relation to the upward movement are likely to differ significantly. Therefore, situations in which the movement of the electrode holder 22 becomes difficult in both directions can also be addressed.

OTHER EMBODIMENTS

The present disclosure is not limited to the above-described embodiments. Variations are possible as appropriate, within the scope recited in the scope of claims. In addition, the above-described embodiments are not unrelated to each other. Excluding instances in which combinations are clearly not possible, the embodiments can be combined as appropriate. In addition, it goes without saying that elements configuring each of the above-described embodiments are not necessarily requisite elements, excluding instances in which the element is clearly stated as being a requisite, instances in which the element is clearly a requisite based on principle, and the like.

Furthermore, in the above-described embodiments, where numerical values, such as quantity, numerical value, amount, or range, of a constituent element in the embodiment is mentioned, the numeral value is not limited to the specified number, excluding instances in which the numerical value is clearly stated as being a requisite, instances in which the numerical value is clearly limited to the specified number based on principle, and the like.

Moreover, in the above-described embodiments, where the shape, positional relationship, and the like of the constituent elements and the like are mentioned, the constituent elements are not limited to the shape, positional relationship, and the like, excluding instances in which the constituent element is clearly stated as being limited to the shape, positional relationship, and the like, instances in which the constituent element is limited to a specific shape, positional relationship, and the like based on principle, and the like. For example, following variation examples are also allowed. The variation examples below may individually be selectively applied or not applied to the above-described embodiments. In other words, an arbitrary combination of the variation examples below can also be applied to the above-described embodiments.

First Variation Example

In the above-described embodiments, the balls 28d in the infinite circulation path of the linear guide 28 are not connected by a ball retainer. The ball retainer maintains the distance between the balls 28d at a fixed distance and interconnects the balls 28d to each other. However, the balls 28d in the infinite circulation path of the linear guide 28 may be balls 28d that are connected by a ball retainer. In this instance as well, the problem of dust being produced occurs in a manner similar to the balls 28d that are not connected by a ball retainer in the present disclosure. This problem is resolved by the above-described upper/lower limit stroke control.

Second Variation Example

In the above-described embodiments, the linear guide 28 is configured so that spherical balls 28d are interposed between the linear rail 28a and the linear movement blocks 28b and 28c. However, circular columnar rollers may be interposed instead of the spherical balls 28d. In other words, the members interposed between the linear rail 28a and the linear movement blocks 28b and 28c are merely required to be a plurality of rolling elements. In addition, the linear guide 28 that guides linear movement may be replaced with a guide that guides curved movement. In other words, the guide 28 is merely required to be a roller bearing.

What is claimed is:

1. An electrical discharge machine for applying a voltage between an electrode and a workpiece to generate electrical discharge such that the workpiece is melted by the electrical discharge and machined, the electrical discharge machine comprising:
an electrode holder that holds the electrode;
an ultrasonic motor that has a fingertip that comes into contact with the electrode holder, and moves the electrode holder in a predetermined driving direction by moving the fingertip in an annular manner at an ultrasonic-range frequency;
a roller bearing that guides the movement of the electrode holder in the driving direction, the roller bearing comprising:
movement blocks that are fixed to the electrode holder;
a rail that supports the movement blocks and guides movement of the movement blocks; and
a plurality of roller elements that are interposed between the movement blocks and the rail; and
a control circuit that controls a position of the electrode in the driving direction by driving the ultrasonic motor, the control circuit being configured to move the electrode holder based on an abnormality occurring in resistance against the movement of the electrode holder in the driving direction, the electrode holder being moved by a movement distance equivalent to when a largest roller element among the plurality of roller elements rolls and rotates once or longer without sliding.

2. The electrical discharge machine according to claim 1, wherein the control circuit is configured to determine whether or not an abnormality occurs in resistance against the movement of the electrode holder, by comparing a movement speed in the movement of the electrode holder in the driving direction with a predetermined reference speed.

3. The electrical discharge machine according to claim 2, wherein the movement speed compared with the reference speed is:
a movement speed of the electrode holder when the electrode holder moves from a predetermined original position in a predetermined direction towards the workpiece so that a single hole machining is started; or
a movement speed of the electrode holder when the electrode holder is returned to the original position in the predetermined direction after the single hole machining is completed.

4. The electrical discharge machine according to claim 1, wherein the control circuit is configured to determine that an abnormality occurs in resistance against the movement of the electrode holder when at least one of a first condition and a second condition is satisfied,
the first condition being a condition that a first movement speed in a first direction in the driving direction of the electrode holder is lower than a first reference speed, and
the second condition being a condition that a second movement speed in a second direction opposite to the first direction in the driving direction of the electrode holder is lower than a second reference speed.

5. The electrical discharge machine according to claim 4, wherein the control circuit is configured to determine whether or not an abnormality occurs in resistance against the movement of the electrode holder by comparing the first movement speed with the second movement speed.

6. The electrical discharge machine according to claim 5, further comprising:
a discharge state detection circuit that detects a discharge state between the electrode and the workpiece to produce a discharge state signal, and outputs the discharge state signal,
the control circuit being configured to:
move the electrode holder in the driving direction based on the discharge state signal output by the discharge state detection circuit, such that when the electrode and the workpiece are short-circuited, the electrode moves in a direction away from the workpiece; and
further determine that an abnormality occurs in resistance against the movement of the electrode holder based on when a period of time during which the electrode and the workpiece are short-circuited exceeds a reference time.

7. The electrical discharge machine according to claim 6, wherein the control circuit is configured to move the electrode holder based on an abnormality occurring in resistance against the movement of the electrode holder in both of the first direction and the second direction, such that the electrode holder is moved by the movement distance.

8. The electrical discharge machine according to claim 1, wherein the control circuit is configured to determine whether or not an abnormality occurs in resistance against the movement of the electrode holder by comparing a first movement speed in a first direction along the driving direction of the electrode holder with a second movement speed in a second direction opposite to the first direction along the driving direction of the electrode holder.

9. The electrical discharge machine according to claim 1, further comprising:
a discharge state detection circuit that detects a discharge state between the electrode and the workpiece to produce a discharge state signal, and outputs the discharge state signal,
the control circuit being configured to:
move the electrode holder in the driving direction based on the discharge state signal output by the discharge state detection circuit, such that when the electrode and the workpiece are short-circuited, the electrode moves in a direction away from the workpiece; and
further determine that an abnormality occurs in resistance against the movement of the electrode holder based on when a period of time during which the electrode and the workpiece are short-circuited exceeds a reference time.

10. The electrical discharge machine according to claim 1, wherein the control circuit is configured to move the electrode holder based on an abnormality occurring in resistance against the movement of the electrode holder in both of a first direction and a second direction opposite to the first direction along the driving direction of the electrode holder, such that the electrode holder is moved by the movement distance.

11. A method for manufacturing a machined object, comprising:
(i) a step of providing a workpiece for the machined object with respect to an electrical discharge machine for applying a voltage between an electrode and the workpiece to generate electrical discharge such that the workpiece is melted by the electrical discharge and machined, the electrical discharge machine comprising:
an electrode holder that holds the electrode;
an ultrasonic motor that has a fingertip that comes into contact with the electrode holder, and moves the electrode holder in a predetermined driving direction by moving the fingertip in an annular manner at an ultrasonic-range frequency;
a roller bearing that guides the movement of the electrode holder in the driving direction, the roller bearing comprising:
movement blocks that are fixed to the electrode holder;
a rail that supports the movement blocks and guides movement of the movement blocks; and
a plurality of roller elements that are interposed between the movement blocks and the rail; and
a control circuit that controls a position of the electrode in the driving direction by driving the ultrasonic motor, the control circuit being configured to move the electrode holder based on an abnormality occurring in resistance against the movement of the electrode holder in the driving direction, the electrode holder being moved by a movement distance equivalent to when a largest roller element among the plurality of roller elements rolls and rotates once or longer without sliding; and
(ii) a step of machining the workpiece using the electrical discharge machine.

* * * * *